United States Patent
Stellari

(10) Patent No.: US 9,830,702 B2
(45) Date of Patent: Nov. 28, 2017

(54) DYNAMIC REAL-TIME LAYOUT OVERLAY

(71) Applicant: INTERNATIONAL BUSINESS MACHINES CORPORATION, Armonk, NY (US)

(72) Inventor: Franco Stellari, Waldwick, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/920,291

(22) Filed: Oct. 22, 2015

(65) Prior Publication Data
US 2017/0116722 A1    Apr. 27, 2017

(51) Int. Cl.
| | | |
|---|---|---|
| G06T 7/00 | (2017.01) | |
| G06T 3/40 | (2006.01) | |
| G06F 3/0484 | (2013.01) | |
| G06F 3/0481 | (2013.01) | |

(52) U.S. Cl.
CPC .......... *G06T 7/003* (2013.01); *G06F 3/0481* (2013.01); *G06F 3/04845* (2013.01); *G06T 3/40* (2013.01); *G06T 7/001* (2013.01); *G06T 7/0044* (2013.01)

(58) Field of Classification Search
CPC .. G06F 17/50; G06F 17/5045; G06F 17/5068; G06F 17/5081; G06F 3/04845; G06T 2207/20212; G06T 2207/20221; G06T 2219/2004; G09G 5/377; G09G 2340/12; G09G 5/32
See application file for complete search history.

(56) References Cited

U.S. PATENT DOCUMENTS

| | | | |
|---|---|---|---|
| 8,397,194 B2* | 3/2013 | Uppaluri | G06F 17/5022 716/107 |
| 9,075,106 B2* | 7/2015 | Bernstein | G01R 31/311 |
| 2007/0234260 A1 | 10/2007 | Gonzalez et al. | |
| 2012/0163732 A1 | 6/2012 | Hoshino et al. | |
| 2012/0227024 A1 | 9/2012 | Uppaluri et al. | |
| 2013/0061199 A1 | 3/2013 | Stellari et al. | |

FOREIGN PATENT DOCUMENTS

| | | |
|---|---|---|
| EP | 001540633 A2 | 6/2005 |
| EP | 002820535 A1 | 1/2015 |
| WO | WO 2014100839 A1 | 6/2014 |

OTHER PUBLICATIONS

"Online Documentation for Altium Products—PCB Object and Layer Transparency—Nov. 6, 2013" modified Nov. 6, 2013. Accessed via web @ http://techdocs.altium.com/display/ADOH/PCB+Object+and+Layer+Transparency# on May 5, 2017.*
Chue, Chuei-Fu, et al; "Optimization of alignment/overlay sampling and marker layout to improve overlay performance for double patterning technology." InSPIE Lithography Asia, pp. 75200G-75200G. International Society for Optics and Photonics, Nov. 2009.

* cited by examiner

*Primary Examiner* — Antonio A Caschera
(74) *Attorney, Agent, or Firm* — Tutunjian & Bitetto, P.C.; David M. Quinn

(57) ABSTRACT

Methods and systems for dynamic real-time overlay include identifying positional and dimensional characteristics of an image of a device under test (DUT). Characteristics of the image are correlated with a design layout of the DUT using a processor to determine a size, field of view, and position for the design layout to match the image. The design layout and the image are overlayed, such that both are superimposed and visible simultaneously.

15 Claims, 6 Drawing Sheets

DYNAMIC REAL-TIME LAYOUT OVERLAY

BACKGROUND

Technical Field

The present invention relates to circuit design and analysis and, more particularly, to overlaying a circuit design on an image of the circuit.

Description of the Related Art

Performing tests, diagnostics, and failure analysis of modern integrated chips (ICs) often involves driving analytical tools by means of chip layout information so that appropriate locations may be probed, imaged, modified, etc. There are many such tools using a variety of different imaging techniques.

Chip design layout software is similarly varied. In general, layout tools are designed to show shapes that represent the different elements making up a circuit, such as metal lines, polysilicon gates, diffusions, contacts, etc. Different colors and layers may be used to indicate different parts of the circuit. Moreover, spatial coordinates (e.g., (x,y)) are used to indicate different positions on the chip. Users have the ability to maneuver the design to correspond to a region of a chip image through a user interface.

However, it is often difficult for a user to find correspondences between the image and the design layout that would allow the user to align the image and the layout. In a typical use case, the analytical tool shows a live image of a device under test (for example, an image reconstructed from reflected light) and the user tries to navigate to a desired feature that is known from the layout. In another case, the user has acquired a data image from the analytic tool and wants to determine where in the design layout a point of interest is located. In both of these cases, the user may be frustrated by the fact that circuit designs are often very large. In addition, the images acquired from an analytical tool can be visually very different from the original design layout, due to the former being represented in contrast and pixels, while the latter is represented as, e.g., ideal polygons.

In a typical alignment process, a user attempts to visually identify some unique features that are easy to locate in both an image of the device under test and the layout design. However, even for an expert user, identifying these correspondences is error prone, difficult, and time consuming.

SUMMARY

A method for dynamic real-time overlay includes identifying positional and dimensional characteristics of an image of a device under test (DUT). The characteristics of the image are correlated with a design layout of the DUT using a processor to determine a size, field of view, and position for the design layout to match the image. The design layout and the image are overlayed, such that both are superimposed and visible simultaneously.

A method for dynamic real-time overlay includes identifying positional and dimensional characteristics of an image of a device under test (DUT). The characteristics of the image are correlated with a design layout of the DUT using a processor to determine a size, field of view, and position for the design layout to match the image. The design layout and the image are overlayed, such that both are superimposed and visible simultaneously. Overlaying the design layout and the image includes adjusting a size of a first graphical user interface window displaying one of the design layout and the image to match a size of a second graphical user interface window displaying the other of the design layout and the image. A field of view of the first window is adjusted to match a field of view of the second window. The first window is moved over the second window.

A system for dynamic real-time overlay includes an analysis module configured to analyze and display an image of a DUT. A layout module is configured to display a design layout that matches the DUT. An overlay module comprising a processor is configured to identify positional and dimensional characteristics of the image. The overlay module correlates the characteristics of the image with a design layout of the DUT using a processor to determine a size, field of view, and position for the design layout to match the image and overlays the design layout and the image, such that both are superimposed and visible simultaneously.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention automatically provide a real-time overlay of an integrated chip (IC) design layout and an image of an actual device according to that layout. The present embodiments gather information from an analytical tool and a layout browser, adjust the layout to match the image from the analytical tool in size and orientation, and overlay the layout and the image. The user can then manipulate both images at once, with the overlay being adjusted automatically, which is useful for orientation, navigation, and identification of specific features on the IC.

Figure 1:
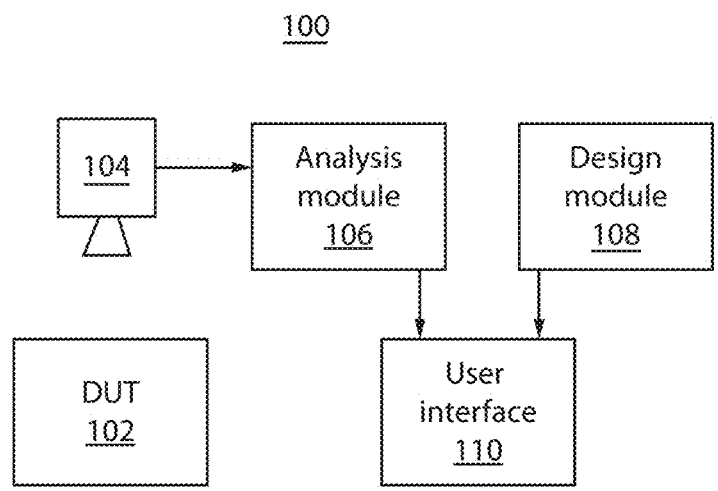
FIG. 1 is a block diagram of a system for dynamic, real-time overlay in accordance with the present principles.

Referring now to the drawings in which like numerals represent the same or similar elements and initially to FIG. 1, a diagram of a layout/analysis system 100 is shown. A camera 104 images a device under test (DUT) 102 and produces data that is analyzed by the analysis module 106. Although the use of camera 104 is specifically contemplated, it should be understood that any appropriate data acquisition and analysis technology may be employed. Examples of such tools include picosecond imaging circuit analysis (PICA), static emission tools, laser voltage probes, laser stimulation tools, focus ion beams, etc. The analysis module accepts raw data from the camera 104 or other probe device and turns the raw data into an image of the DUT 102. The image is provided to a user interface 110 for display.

The analysis module 106 may further identify key points in the image to be used as markers. This information may include coordinates, magnification, field of view, etc.

A design module 108 accesses a design layout that corresponds to the DUT 102 and supplies the design layout to the user interface 110. The user interface 110 adapts the design layout in accordance with key points in the image, scaling and orienting the design layout to overlay the design layout and the image and create a composite image. The user interface 110 may change the size and position of the design layout to fit the image. The user interface 110 may also adjust a transparency of the design layout or the image, such that both images may be visible simultaneously. In one embodiment a transparency of 40% may be used, but it is contemplated that any appropriate transparency may be employed instead. The user interface 110 then allows the user to manipulate both the image and the layout at the same time, panning and reorienting the image while the design layout follows.

Figure 2:
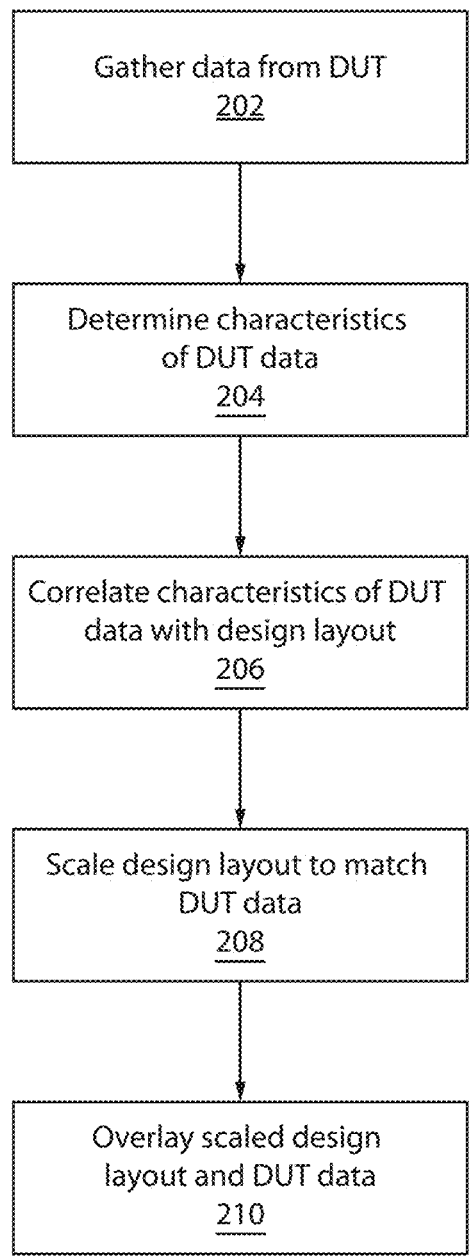
FIG. 2 is a block/flow diagram of a method for dynamic, real-time overlay in accordance with the present principles.

Referring now to FIG. 2, a dynamic overlay method is shown. Block 202 gathers data from the DUT 102 using, e.g., camera 104. Block 204 then determines the relevant characteristics of the DUT data. These characteristics may include, for example, the magnification of the image, the field of view, the current location of the camera 104 relative to the DUT 102, etc. The operation of block 204 includes, for example, determining the amount of real area per pixel, which is used to establish a scale for the DUT data and the design layout. Block 206 then correlates the characteristics of the DUT data with the design layout that corresponds to the DUT 102.

This correlation includes retrieving the current physical stage position for the DUT 102 and performing a mathematical transformation based on an existing three-point alignment so that the coordinates can be used in the layout design's coordinate system. Block 206 further retrieves the field of view and image display size of a window for the analysis module 106 and computes a pixel scale factor as a size of the field of view divided by the size of the display image. Block 206 retrieves the display size of a window for the design module 108 and calculates a layout browser field of view based on the previous scaling.

In a three-point alignment, the user manually identifies three (or more) locations in both the analytical tool image and layout browser that are known to be the same. For example, three corners of a chip or structure may be used to represent the three points. Using the coordinates of the three structures in both the analytical tool coordinate system and the layout browser, one can use linear algebra to compute a transformation matrix that enables computation of the coordinate of any other point in either image based on coordinates in the other image. For example, assuming $(x_{li},y_{li})$ and $(x_{ai},y_{ai})$ are points manually identified by the user, then one can write the system of equation:

$$\begin{bmatrix} x_{l1} & y_{l1} \\ x_{l2} & y_{l2} \\ x_{l2} & y_{l3} \end{bmatrix} = \begin{bmatrix} x_{a1} & y_{a1} & 1 \\ x_{a2} & y_{a2} & 1 \\ x_{a3} & y_{a3} & 1 \end{bmatrix} \cdot A$$

Solving this system produces the transformation matrix A.

Three-point alignment is initially performed by the user to establish a coordinate transformation between the layout browser and the analytical tool so that all other computations can be performed automatically. In some cases, especially at lower magnification, this type of alignment is sufficient to achieve satisfactory overlay quality. In other cases, more advanced registrations are necessary. In one embodiment, once the overlay is achieved, the user can use special keys or shortcuts to refine the alignment. For example, the user may use arrow keys to finely move the layout left/right/up/down. In another embodiment, specific layers and features of the layout image presented by the layout browser are extracted, analyzed, and compared to features extracted from the live pattern image. Correlation or feature point detection can be used to compute the fine adjustments for improving the layout overlay locally.

Block 208 scales the design layout to match the DUT data. For example, once block 206 has correlated features of the DUT data with features of the design layout, the design layout can be scaled and oriented to align its features with the corresponding features of the DUT 102. Block 210 then overlays the scaled design layout and the DUT data, providing a depiction of both simultaneously with features of the DUT 102 being made obvious by the overlay of the design. Block 210, for example, centers the design layout at the location currently displayed in the DUT data. The field of view may be adjusted so that a feature in the DUT data will be displayed with the same number of pixels as the same feature in the overlayed design layout. So, if a certain feature in the DUT data is displayed in a way that uses X screen pixels, the layout field of view will be adjusted so that the corresponding polygon will also be displayed in X pixels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
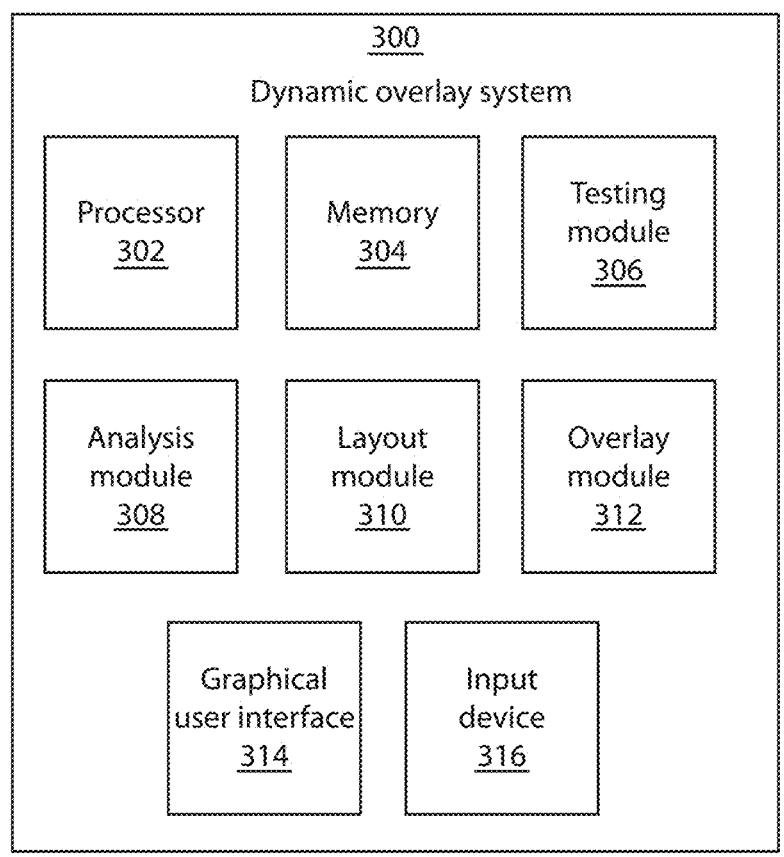
FIG. 3 is a block diagram of a system for dynamic, real-time overlay in accordance with the present principles.

Referring now to FIG. 3, a system 300 for dynamic layout overlay is shown. The system 300 includes a hardware processor 302 and memory 304. The system 300 further includes multiple functional modules. These modules may be implemented as, e.g., software that is executed on the processor 302 and stored in the memory 304. Alternatively, the modules may be implemented as one or more discrete hardware units in the form of, e.g., application specific integrated chips or field programmable gate arrays. Additionally, the system 300 may be one device or multiple device in communication with one another. In the latter case, some form of communication interface will be present to exchange information between different physical devices.

A testing module 306 communicates with, e.g., camera 104 to obtain real-time data from DUT 102. The analysis module 308 receives this data and, as described above, obtains information about the data. Similarly layout module 310 accesses the design layout stored in memory 304 and obtains information that is correlated with the data from the analysis module 308 by the overlay module 312.

In one specific embodiment, the analysis module 308 and the layout module 310 are standalone pieces of software, each having a respective window in the graphical user interface 314. The analysis module 308 is often associated directly with the particular form of data collection and may be supplied by the manufacturer. As such, it may be difficult to alter the behavior of the analysis module 308 directly. Similarly, while multiple types of layout software exist, it cannot be assumed that the hard-coded behavior of the layout module 310 can be modified.

The overlay module 312 coordinates the analysis module 308 and the layout module 310 by way of one or more application program interfaces (APIs) that allows the overlay module 312 to issue commands to the analysis module 308 and the layout module 310. The overlay module 312 may run in the background, being triggered by the user through, for example, some key combination or graphical interface. Upon receiving the trigger, the overlay module 312 gathers key information from both the analysis module 308 and the layout module 310 using the API. In particular, the overlay module obtains information regarding the DUT position, magnification, orientation, field of view, and display information such as the position and size of windows on a graphical user interface 314.

The overlay module 312 performs the correlations described above with respect to block 206. After determining the correct overlay parameters for the layout module 310, the overlay module resizes and repositions a window for the layout module 310 in the graphical user interface 314 to align the displayed design layout with the image displayed by the analysis module 308. The layout field of view $FOV_l$ is calculated as $$FOV_l = \frac{SIZE_l}{SIZE_a} FOV_a,$$

where $SIZE_l$ is the size of the window for the layout module 310, $SIZE_a$ is the size of the window for the analysis module 308, and $FOV_a$ is the field of view of the window of the analysis module 308.

The displayed center of the design layout is moved to be at the same coordinates as the displayed center of the DUT data. This is accomplished by finding the center position of the analysis module window $(X_a, Y_a)$, the center position of the layout module window image $(X_{li}, Y_{li})$, and the original position of the layout module window $(X_l, Y_l)$. The new window position for the layout module 310 is then calculated as $X_{new} = X_l - X_{li} + X_a$ and $Y_{new} = Y_l - Y_{li} + Y_a$. The original position $(X_l, Y_l)$ can later be used to move the window for the layout module 310 back when the overlay mode ends.

The overlay module 312 then instructs the graphical user interface 314 to adjust the transparency (e.g., alpha blending) of the window of the layout module 310 such that the DUT data in the window of the analysis module 308 is visible through the semi-transparent layout module window. It should be noted that, although the present embodiment describes the overlay module 312 as changing the state of the window of the layout module 310, it is also contemplated that the layout module 310 may remain unaltered while the window of the analysis module 308 is moved to overlay the window of the layout module 310.

The overlay module 312 may maintain the live overlay for a predetermined period of time or until a user input is received at input device 316. Once the overlay operation is complete, the overlay module 312 may restore the window for the layout module 310 to its previous position, size, and transparency. Restoring the window may further include restoring the content of the window to its previous position and field of view.

In one embodiment, the overlay module 312 does not move the window of the layout module 310 or make it transparent. In this embodiment, the overlay module 312 only changes the center position and field of view for the window to help the user navigate the chip. In this case, the overlay module 312 may automatically change the center position and field of view of the window in accordance with changes made to the window of the analysis module 310, so that the same position is shown in each window.

The overlay module 312 furthermore interacts with the user interface 314 to determine whether inputs are intended for the underlying window, the overlaying window, or both. Due to the fact that the overlay window is on top, by default any keystrokes and mouse operations would be directed by the user interface 314 to the window that is on top. However, some actions can be taken in the background to allow interaction with, e.g., the analysis module 308. For example, the overlay module 312 may set the focus on the underlying window, even though the overlay window is displayed on top. In this mode, all keystrokes would be directed to the lower window. In a second mode, the overlay module 312 attaches to the foreground process (e.g., the layout module 310) and inserts code to intercept key strokes and mouse clicks. In this second mode, the overlay module 312 filters the key strokes and mouse clicks, removing them from the message queue for the foreground process, and injects them into the message queue for the background process (e.g., the analysis module 308). In this way, both mouse clicks and keystrokes would be intercepted by the background process and redirected to the analysis module 308 to achieve the desired action.

Figure 4:
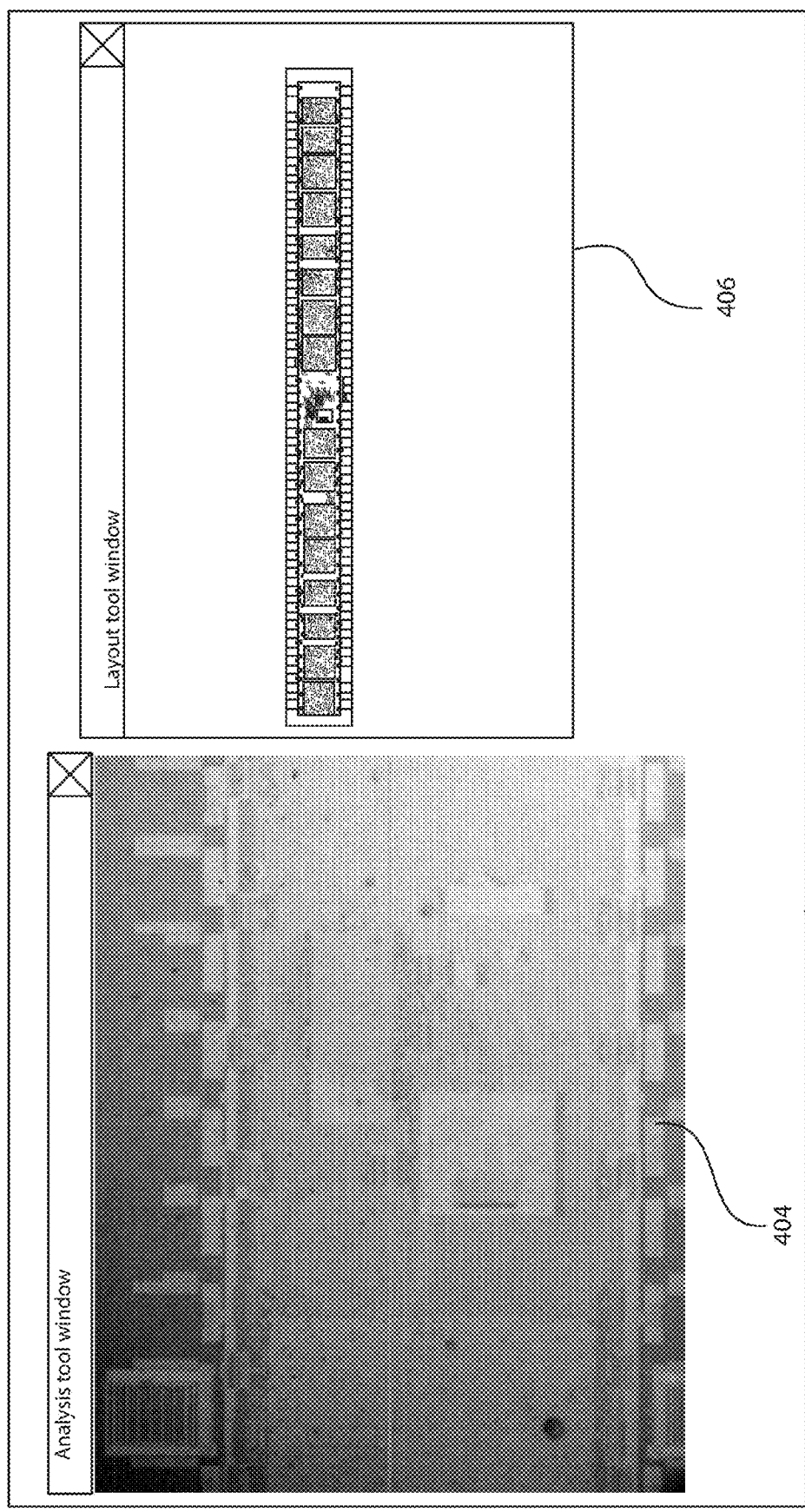
FIG. 4 is a diagram of a step in overlaying an analysis tool window and a layout tool window in accordance with the present principles.

Referring now to FIG. 4, an exemplary user interface 402 is shown. The user interface 402 includes an analysis tool window 404 that shows an image of the DUT 102 as processed by the analysis module 308. A layout tool window 406 shows a design layout corresponding to the DUT 102. It should be noted that the layout tool window 406 shows its design layout at a much different scale from the image of the analysis tool window 404. This represents the state of the user interface 402 before the overlay module 312 acts.

Figure 5:
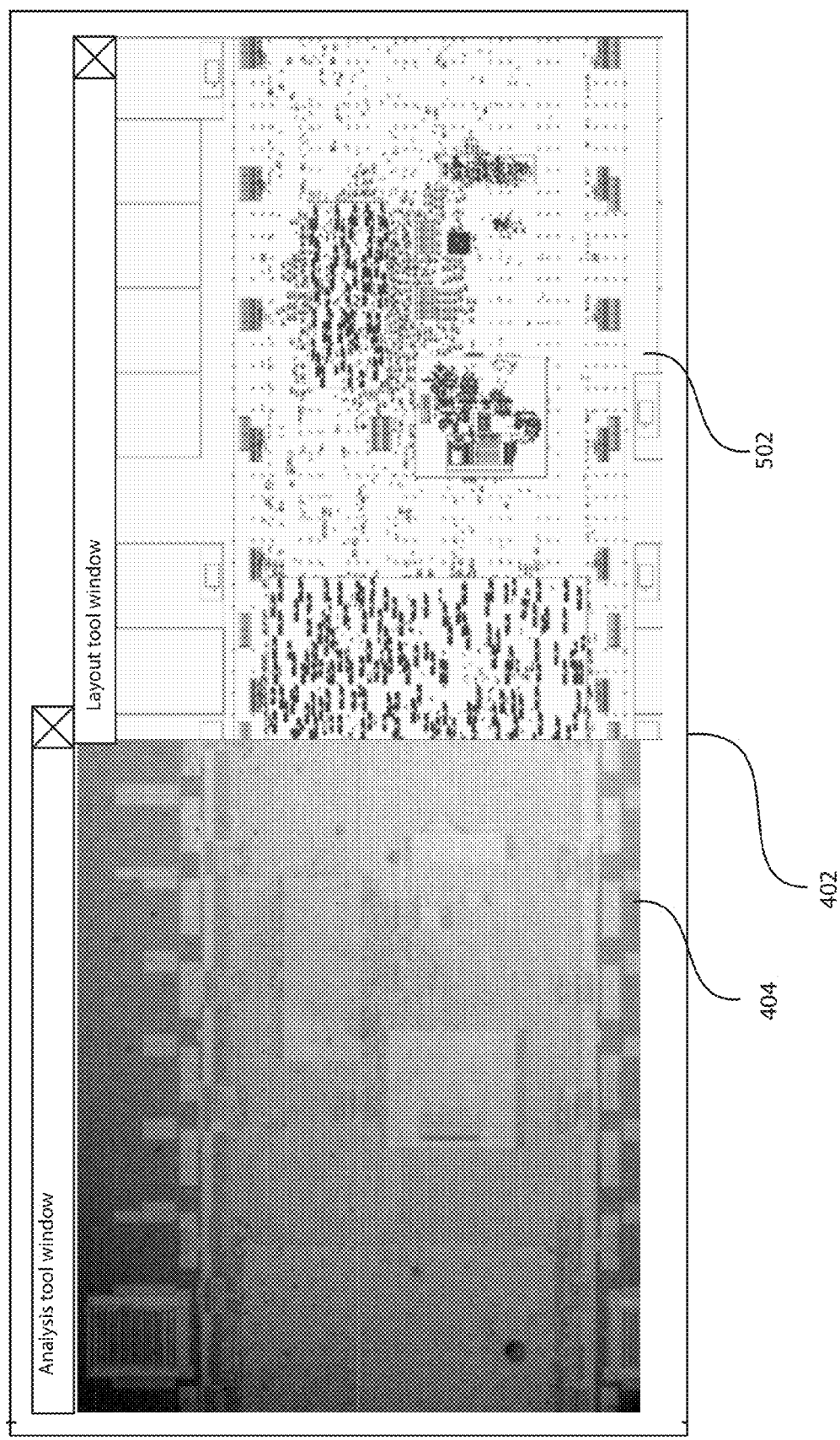
FIG. 5 is a diagram of a step in overlaying an analysis tool window and a layout tool window in accordance with the present principles.

Referring now to FIG. 5, the overlay module 312 has resized the layout tool window 502 to match the analysis tool window 404. In addition, the view of the design layout has changed to match the magnification of the image of the analysis tool window 404 as well as its positioning.

Figure 6:
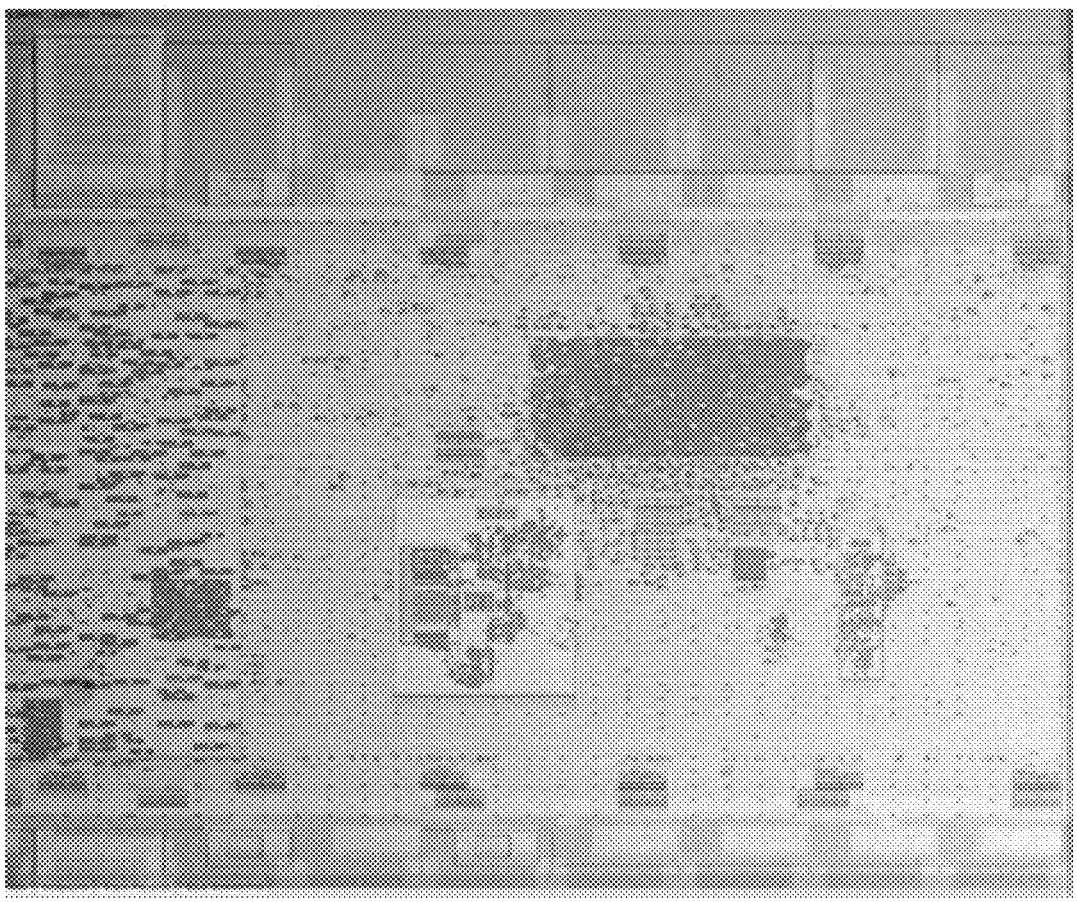
FIG. 6 is a diagram of a step in overlaying an analysis tool window and a layout tool window in accordance with the present principles.

Referring now to FIG. 6, the overlay module 312 has moved the layout tool window 502 over the analysis tool window 404 and changed its transparency so that the analysis tool window 404 is visible through the layout tool window 502. The features of both windows are therefore visible, making it easy for the user to identify specific features in the image.

Having described preferred embodiments of dynamic real-time layout overlay (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for dynamic real-time overlay, comprising:
   identifying positional and dimensional characteristics of an image of a device under test (DUT);
   correlating the characteristics of the image with a design layout of the DUT using a processor to determine a size, field of view, and position for the design layout to match the image; and
   overlaying the design layout and the image, such that both are superimposed and visible simultaneously, comprising moving a first graphical user interface window displaying one of the design layout and the image over a second graphical user interface window displaying the other of the design layout and the image, wherein the first window is associated with a first program, the second window is associated with a second program, and the steps of correlating and overlaying are performed by a third program without any direct communication between the first and second programs.

2. The method of claim 1, wherein overlaying the design layout and the image further comprises adjusting a size of the first window to match a size of the second window.

3. The method of claim 1, wherein overlaying the design layout and the image further comprises adjusting a field of view of the first window to match a field of view of the second window.

4. The method of claim 1, wherein overlaying the design layout and the image further comprises adjusting a transparency of the first window to make the second window visible.

5. The method of claim 1, further comprising redirecting user inputs to the second window.

6. The method of claim 1, wherein correlating characteristics of the image with the design layout comprises transforming a center position of the image into coordinates of the layout design using three-point alignment.

7. The method of claim 1, further comprising processing test data received from the DUT to produce the image of the DUT.

8. A computer readable storage medium comprising a computer readable program for dynamic real-time overlay, wherein the computer readable program when executed on a computer causes the computer to perform the steps of claim 1.

9. A method for dynamic real-time overlay, comprising:
   identifying positional and dimensional characteristics of an image of a device under test (DUT);
   correlating the characteristics of the image with a design layout of the DUT using a processor to determine a size, field of view, and position for the design layout to match the image; and
   overlaying the design layout and the image, such that both are superimposed and visible simultaneously, comprising:
   adjusting a size of a first graphical user interface window displaying one of the design layout and the image to match a size of a second graphical user interface window displaying the other of the design layout and the image;
   adjusting a field of view of the first window to match a field of view of the second window; and
   moving the first window over the second window,
   wherein the first window is associated with a first program, the second window is associated with a second program, and the steps of overlaying are performed by a third program without any direct communication between the first and second programs.

10. A system for dynamic real-time overlay, comprising:
    an analysis module configured to analyze and display an image of a device under test (DUT);
    a layout module configured to display a design layout that matches the DUT;
    an overlay module comprising a processor configured to identify positional and dimensional characteristics of the image; to correlate the characteristics of the image with a design layout of the DUT using a processor to determine a size, field of view, and position for the design layout to match the image; to overlay the design layout and the image, such that both are superimposed and visible simultaneously; and to move a first graphical user interface window displaying one of the design layout and the image over a second graphical user interface window displaying the other of the design layout and the image, and there is no direct communication between the analysis module and the layout module.

11. The system of claim 10, wherein the overlay module is further configured to adjust a size of the first window to match a size of the second window.

12. The system of claim 10, wherein the overlay module is further configured to adjust a field of view of the first window to match a field of view of the second window.

13. The system of claim 10, wherein the overlay module is further configured to adjust a transparency of the first window to make the second window visible.

14. The system of claim 10, wherein the overlay module is further configured to redirect user inputs to the second window.

15. The system of claim 10, wherein the overlay module is further configured to transform a center position of the image into coordinates of the layout design using three-point alignment.

* * * * *